United States Patent Office
3,112,253
Patented Nov. 26, 1963

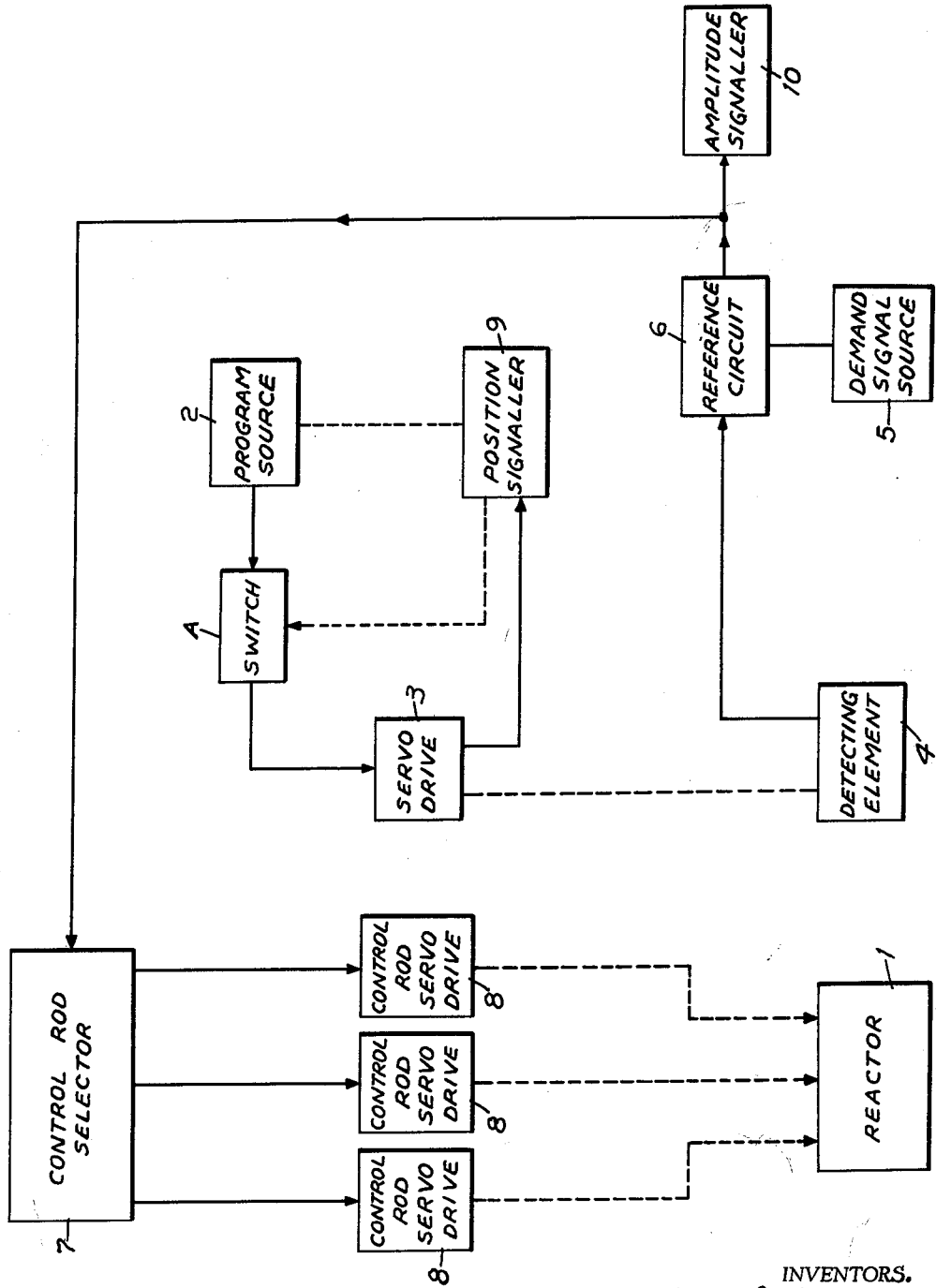

3,112,253
EQUIPMENT FOR AUTOMATIC CONTROL OF AN ATOMIC REACTOR
Pavel Kovanic and Milan Kulka, Prague, Czechoslovakia, assignors to Zavody V.I. Lenina Plzen, narodni podnik, Plzen, Czechoslovakia
Filed Feb. 16, 1959, Ser. No. 793,640
Claims priority, application Czechoslovakia Feb. 18, 1958
8 Claims. (Cl. 204—154.2)

Known devices for automatic control of an atomic-reactor in the startup or source range include elements which are selectively connected to each other to function either as a reactor period meter having a movable detecting element, or as an automatic period control system with a movable detecting element. In such known devices, at the beginning of the startup of the reactor from the subcritical state, the approach to the critical state is achieved by increasing the multiplication factor through actuation of the control rods in accordance with a predetermined program which is independent of the position of the detecting element, and, consequently, in this phase of the startup the program of the changes of the reactivity is predetermined, and the device using a movable detecting element works only as a measuring device. The advantage of this known device resides in the fact that an automatic system of the mentioned type can be comparatively easily realized from existing equipment of the manual type or the existing equipment may be only partially automatized, and full automation can be introduced stepwise. A shortcoming of the mentioned automatic device is that the program of changes of the reactivity of the subcritical reactor must be determined from the outside, taking into account the instantaneous state of the reactor, quantity of fuel, quantity of absorber, state of poisoning and burning-down, the nonlinearity of the effectiveness of the control rods as a function on their position, and other factors, whereby it is usually necessary that this program be varied from time to time. Apart from this, the non-linearity of the efficiency of the control rods retards the process of attaining the critical state if, for safety reasons, the permissible maximum rate of change of the reactivity of the subcritical reactor is specified. Endeavors to eliminate this shortcoming would result in a considerable complication of the equipment for programming the approach of the reactor to the critical state.

Accordingly, it is an object of this invention to provide a method and apparatus for effecting the automatic startup of a reactor, while avoiding the foregoing disadvantages of the devices presently used for that purpose.

In accordance with the invention, the automatic startup of an atomic reactor from the subcritical state is effected by moving a radiation detecting element relative to the reactor in accordance with the desired program of reactor power variations, comparing the output signal from the detecting element with a suitable demand signal and deriving a differential control signal corresponding to the difference, if any, between the output and demand signals, and feeding the control signal to the servomechanisms of the control rods by way of a control rod selector mechanism which causes the control signal to actuate the control rods in succession as each rod reaches a predetermined position.

An embodiment of the invention will now be described in detail with reference to the accompanying drawing which schematically represents the elements or components thereof.

The elements shown in the drawing can operate as a multiplication factor control system for the subcritical reactor with a movable detecting element, or as a period control system with a movable detecting element, or as a power level control system. The operation of the elements as a multiplication factor control system during the first stage of the reactor startup is achieved with the circuit closed at the point A. The program source or power supply 2 imparts a motion to the detecting element 4 by means of the servodrive 3. At the beginning of the startup range, the detecting element 4 is moved from the active zone of the reactor at a speed corresponding to the desired program, and such movement results in a difference between the output signal from the detecting element 4 and the demand signal from a power supply 5 which are both fed to a reference circuit 6. The resulting differential or control signal is led a control rod selector 7 which brings about the conveyance of the control signal to the servodrive 8 of one of the control rods of the reactor. The movement of the selected control rod in accordance with the control signal augments the multiplication factor of the reactor at a velocity which, at any instant, is determined by the position of the detecting element and the velocity of its movement. When the control rod which is initially displaced to a predetermined position, the selector 7 switches the output signal from the circuit 6 to the servodrive 8 of the next control rod. In this way the multiplication factor rises at a velocity determined by the program of the movement imparted to the detecting element and by the distribution of the field of radiation along the path of the detecting element. At any instant, the effect of the servodrive 8 then actuated by the control signal from the reference circuit 6 is to move the related control rod of the reactor in the sense for equalizing the output signal of the detecting element 4 with the demand signal from the power supply 5. The approach of the reactor to the critical state can be judged on the basis of the power level of the reactor to which the position of the detecting element 4 corresponds. During operation of the device as a reactor period control system, that is, during the second stage of reactor startup, the equipment works in a similar way as in the preceding state, only with a different rate of movement being imparted to the detecting element. The difference between the control in the subcritical or source range and the control in the supercritical or period range consists in the fact that, in the subcritical reactor, the increase of the output is achieved by continuous shifting of the control rod, while, in the supercritical state, the output increases while the control rods remain approximately stationary. During automatic reactor period control, the equipment automatically compensates for the influences of the thermal coefficient and other coefficients upon the reactivity of the reactor so that the reactor period remains equal to the desired or demanded value. After attaining the required output, further increase of the power level of the reactor is stopped by disconnecting the circuit by means of the switching element A which disconnects the servodrive 3 of the detecting element from the power supply 2 so that the detecting element 4 then remains in a position corresponding to a power level which is to be maintained. The signal for actuating the switching element A can be derived from the position signaller 9 or it may come from outside. After stopping the detecting element, any difference between the output signal from detecting element 4 and the demand signal from power supply 5 produces a control signal which controls the control rods of the reactor so as to maintain the output of a reactor at the level determined by the position of the detecting element. A change of the power level is achieved merely by shifting the detecting element into the position corresponding to the required output. The equipment then transfers the output of the reactor to the new level with a period determined by the speed at which the detecting element is moved to its new position.

Any failure of the described control system is easily detected by means of an amplitude signaller 10 which is connected to the reference circuit 6 and responds to an excessively high control signal from the latter, or by means of the position signaller 9, because the majority of the possible failures will lead either to an abnormally high control signal or to the movement of the detecting element 4 to its extreme position.

The method and apparatus according to the invention have the advantages of employing elements that are relatively simple and reliable, and of permitting acceleration of the approach to the critical state with maintenance of the required degree of safety even though the control rods have a non-linear influence on the output.

We claim:

1. A method of automatically controlling a nuclear reactor during its startup from the subcritical state, which reactor has a plurality of movable control rods; comprising the steps of moving a detecting element within the radiation field of the reactor in the direction away from the reactor and at a speed corresponding to a desired program of reactor output variations, comparing the output signal of said detecting element with a predetermined demand signal to produce a control signal corresponding to the difference between said demand and output signals, and moving the control rods successively to a predetermined maximum extent in response to said control signal so as to minimize the latter.

2. A method as in claim 1; wherein, upon the reactor attaining its critical state, the speed of movement of said detecting element is altered to correspond to the desired reactor period.

3. A method is in claim 2; wherein, upon said detecting element reaching a predetermined position corresponding to the power level at the top of the period range, the movement of said detecting element is halted and any control signal representing a difference between said output signal and said demand signal is used to adjust a control rod for maintaining said power level.

4. Apparatus for automatically controlling the startup of a nuclear reactor from the subcritical state, comprising a plurality of control rods which are individually movable to vary the output of the reactor, servodrives for individually moving said control rods, a detecting element movable away from the reactor within the radiation field of the latter, servomechanism for effecting the movement of said detecting means, programming means operating said servomechanism so as to move said detecting element at a predetermined speed, means generating a predetermined demand signal, means comparing the output signal from said detecting element with said demand signal and producing a control signal corresponding to the difference between said output and demand signals, and control rod selector means leading said control signal to said servodrives of the control rods in a predetermined successive order so that a control rod is moved in response to said control signal to minimize the latter and, upon the movement of the control rod to a predetermined extent, the next control rod in said successive order is moved in response to said control signal.

5. Apparatus as in claim 4; further comprising means responsive to the position of said detecting element and operative to control said programming means for altering the speed of movement of said detecting element to a speed corresponding to a desired reactor period upon said detecting element reaching a position corresponding to the critical state of the reactor.

6. Apparatus as in claim 5; further comprising means disconnecting said servomechanism from said programming means to halt further movement of said detecting element when the latter has attained a position corresponding to a power level which is to be maintained.

7. A method of automatically controlling a nuclear reactor during its startup from the subcritical state, which reactor has a plurality of movable control rods; comprising the steps of moving a detecting element within the radiation field of the reactor in the direction away from the reactor and at a speed corresponding to a desired program of reactor output variations, comparing the output signal of said detecting element with a predetermined demand signal to produce a control signal corresponding to the difference between said demand and output signals, and moving the control rods successively to a predetermined maximum extent in response to said control signal.

8. A method of automatically controlling a nuclear reactor during its startup from the subcritical state, which reactor has movable control rod means, comprising the steps of moving a detecting element within the radiation field of the reactor in the direction away from the reactor and at a speed corresponding to a desired program of reactor output variations, comparing the output signal of said detecting element with a predetermined demand signal to produce a control signal corresponding to the difference between said demand and output signals, and moving the control rod means in response to said control signal.

References Cited in the file of this patent

Schultz: Control of Nuclear Reactors and Power Plants, McGraw-Hill (1955), pages 70 and 189–190; pages 110, 188, 239–243.